Nov. 8, 1966  J. M. ERNST  3,283,879
BOWLING PIN CONVEYING MECHANISM
Filed Nov. 27, 1963
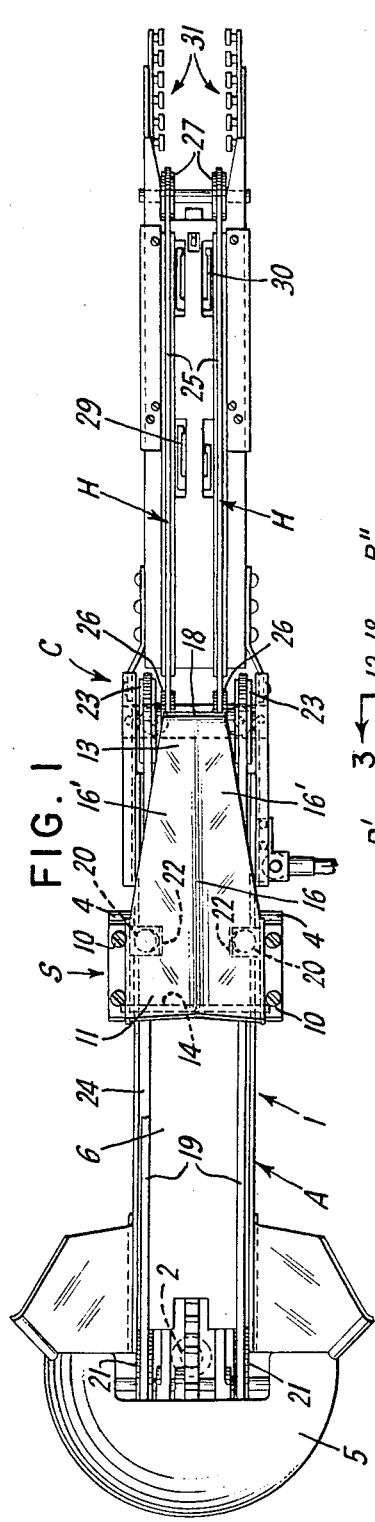
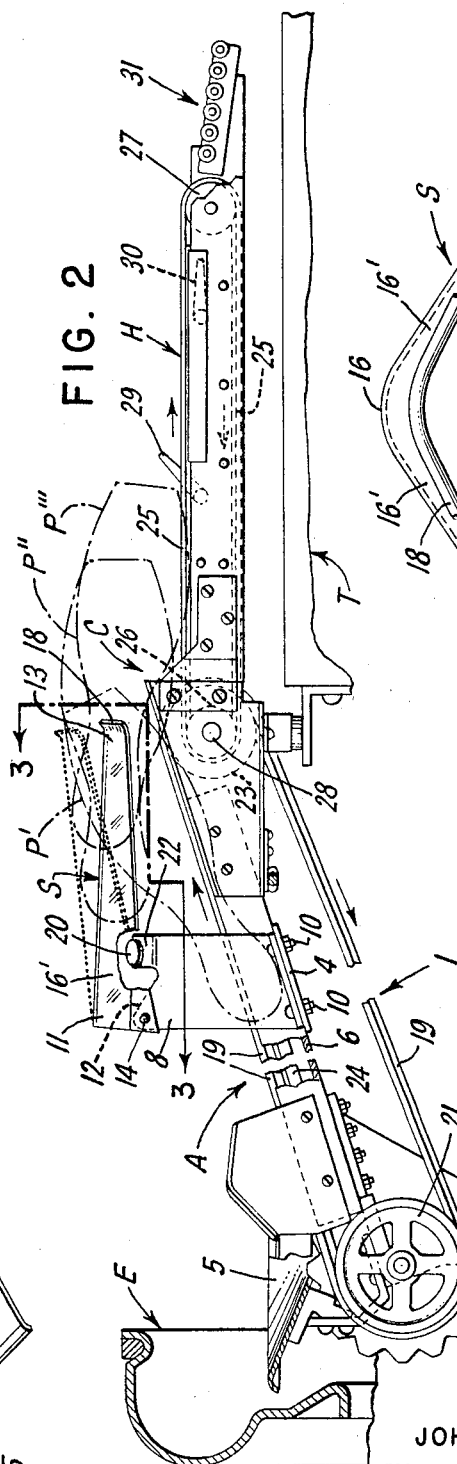
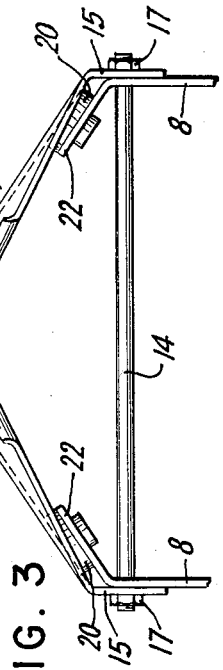
INVENTOR
JOHN M. ERNST
BY
Wentworth B. Clapham
ATTORNEY

United States Patent Office 3,283,879
Patented Nov. 8, 1966

3,283,879
BOWLING PIN CONVEYING MECHANISM
John M. Ernst, Shelby, Ohio, assignor to American Machine & Foundry Company, a corporation of New Jersey
Filed Nov. 27, 1963, Ser. No. 326,522
6 Claims. (Cl. 198—20)

This invention relates to an article positioning or aligning device for a conveying mechanism. More particularly it relates to a device adapted to align or center elongated articles, such for example as bowling pins, for proper movement by a distributing mechanism to a point of discharge therefrom.

Bowling pin spotting machines generally comprise means for sweeping pins from the pin deck of a bowling lane into a pit, elevating the pins from the pit, a distributor to which such pins are delivered, and which in turn effects the regulated delivery of pins to positions where they are available for delivery to means which spot them on the pin deck of the lane. In one type of machine the distributor comprises an elongated member or boom pivoted at one end on a vertical axis and adapted to move horizontally back and forth across and above a pin storage section. Pins are conveyed along the distributor and automatic means are provided for discharging pins at desired selected points therefrom.

A machine embodying this general arrangement is disclosed in patent application Serial No. 195,928, filed May 18, 1962 by Roy E. Blewitt, Jr., and James W. Elliott, now Patent No. 3,248,109 and entitled "Bowling Pin Distributing Mechanism." The present invention will be described as associated with such a machine to facilitate understanding of its structure and operation, but this association is intended to be illustrative only and not to limit the invention, the scope of which is defined in the appended claims.

For reasons of space and structural limitations, it has been found desirable to incline the portion of the distributor boom adjacent the pivot upwardly, while the forward portion is made horizontal. The traverse of the boom, however, is in a horizontal plane.

In the embodiment selected for purposes of illustration, pins are delivered by the pin elevating apparatus to the distributor at a discharge station adjacent its pivoted end and transported up the inclined portion thereof by conveying means, such as a pair of parallel flexible conveyor belts. On reaching the horizontal portion of the boom the forward moving pins are received on a second conveyor, shown herein as a pair of parallel conveyor belts by which they are transported along the horizontal portion to the desired discharge points.

As each pin passes from the inclined to the horizontal portion or transition point of the boom, its longitudinal axis moves through a vertical angle at least equal to the angle between the two portions, and as its center of gravity passes the inflection point, its forward, i.e., butt end may have a tendency to drop sharply thus throwing up its head end or the head end may tend to swing or twist to one side and cause misalignment of the pin in its further travel on the second pair of conveyor belts. Should a misalignment occur in the horizontal portion of the distributor boom, it will adversely affect the proper delivery of pins to the pin storage section. Avoidance of such misalignment is therefore essential to proper operation of the machine.

It is therefore an object of the invention to provide means for insuring the proper aligned delivery of bowling pins to a pin storage section of a bowling pin spotting machine.

The invention is further characterized by the provision of a novel device which coacts with the bowling pin distributor of a pin spotting machine in which pins are delivered from a pin discharge station of an elevating conveyor upwardly to a transistion point onto a substantially horizontal conveying boom forming a part of the distributor in such manner that each pin is properly aligned for further movement on the boom to its selected discharge position therefrom.

It is a further object of the invention to provide a novel pin distributing and aligning mechanism for use in a bowling pin spotting machine wherein each pin passing upwardly along the distributor to a point of transition onto a generally horizontal delivery position of the distributor is constrained against unwanted movement such that it travels on the delivery portion of the distributor in properly aligned position to its selected point of discharge therefrom.

These and other objects and advantages will become apparent from the following description when read in conjunction with the accompanying drawings, in which:

FIGURE 1 is a plan view of a preferred embodiment of the invention;

FIGURE 2 is an elevation, partly in section, of the mechanism shown in FIGURE 1; and FIGURE 3 is a view taken on line 3—3 in FIGURE 2.

In the drawing distributor D is essentially the same in construction and operation to that shown and described in copending application Serial No. 195,928 referred to hereinabove. It comprises a two part or portion boom 1 indicated generally by the letters A and H; A pointing out the inclined and H the horizontal portions. The point of inflection i.e., the point of change from the incline to the horizontal, is indicated by C. The vertical pivot on which boom 1 swings is shown at 2 rotatably mounted in fixed portion 3 of the machine frame. T represents a pin receiving section or station into which the pins are discharged from the boom. A pin-elevating device E which may be of the type disclosed in Holloway et al. Patent 2,767,983, or Zuercher Patent 3,079,154 can be used for conveying pins from the pit of a bowling lane (not shown) to an elevated discharge station where they are delivered into distributor pin receiving chute or pan 5 which forms a part of distributor D.

Since the structure of distributor D and its ancillary parts are disclosed in detail in the patent application Serial No. 195,928, mentioned above, only sufficient details will be described below necessary to an understanding of the invention.

Two vertical supports 8, one on each side of inclined portion A of the boom 1 are secured, as by bolts 10, to a transverse plate 4 secured to the underside of the boom. Between the upper rear corners 12 of supports 8 is mounted a transverse rod 14 passing through the rear corners of the downturned sides 15 of aligning device S and serving as a pivot therefor. Rod 14 may be either fixed in supports 8 and free in sides 15 or fixed in sides 15 and rotatable in supports 8. Rod 14 is secured against endwise movement by nuts 17, or other suitable conventional means.

In the form selected for purposes of illustration stabilizer S comprises a sheet metal member of generally inverted V-shape tapered in a horizontal plane from its pivot end 11, which is broad enough to span boom portion A, to its forward end 13, as best shown in FIGURE 1. The sheet forming the body of aligning device S is bent downward from a longitudinal ridge 16 to form two side panels 16' integral with depending sides 15, as best seen in FIGURE 3. The forward edge of aligning device S is advantageously formed with an upturned lip or bead 18. It will be seen that device S is free to pivot around rod 14 from its normal horizontal position to an upcanted position as shown by dotted lines in FIGURE 2. Rubber buttons 20 mounted on bent-in tabs 22 of supports 8 receive and cushion the drop of aligning device S from its upcanted position.

Supports 8 are positioned lengthwise of portion A of the boom so that forward end of aligning device S overhangs point of inflection C. It will be obvious that the forward end of aligning device S could extend beyond point C and over portion H, if desired.

Referring to FIGURES 1 and 2 it will be seen that one pair of flexible conveyor belts 19 is trained over a first pair of pulleys 21 rotatably mounted on shaft 22 at the rear end of distributor D and over a second pair of pulleys 23 rotatably mounted at the point of inflection C. The space between the belts is less than the diameter of the butt portion of the ten pins or other elongated article being transported so that each pin delivered to the distributor boom will rest on the belts. The head end of a pin is prevented from falling to an inverted vertical position by plate 6 secured to the distributor frame below and between belts 19. The upper runs of belts 19 are supported against sagging by fixed troughs 24 also forming a part of the distributor frame. Power is applied to shaft 22 by conventional means (not shown), to rotate pulleys 21 and cause belts 19 to travel in the direction indicated by the arrows in FIGURE 2.

It will thus be seen that when a pin is delivered butt first to distributor D by elevator E, its butt end will rest on the upper runs of belts 19 and its small end will rest on plate 6, while the movement of the belts will convey the pin upwards along inclined portion A of boom 1.

A second pair of belts 25, spaced somewhat closer together, is similarly trained along the horizontal portion H of boom 1 over a rear pair of pulleys 26 and a forward pair of rotatably mounted pulleys 27. Pulleys 23 and 26 are both fixedly mounted on rotatable shaft 28 so that when pulleys 23 are rotated by the movement of belts 19, pulleys 26 are also rotated and cause belts 25 to travel in the same sense as belts 19 as indicated by the adjacent arrows in FIGURE 2. Pins conveyed along portion H of the boom may be discharged therefrom as desired, either sidewise from the boom by cam 29 or cam 30, or endwise over rollers 31, as disclosed in copending application Serial No. 195,928. Discharge of the pins is advantageously regulated automatically, but since control of the discharge forms no part of the present invention, its operation is not further described. Belts 19 and 25 are advantageously made of a flexible elastomeric material, such as neoprene, having a suitable pin-gripping surface.

In operation, bowling pins are delivered from elevating device E into receiving pan 5 of distributor D, and move butt end first on belts 19 upwards along inclined portion A of boom 1. The head end of each pin, unsupported by belts 19 trails on plate 6. As each pin approaches the point of inflection or transition point C, its butt end engages and raises the forward end 18 of pivoted aligning device S as indicated by the dot-and-dash outline of pin P' in FIGURE 2. As the center of gravity of the pin passes point C, its butt end will tend to fall and its head end to rise, but the rise of the head will be limited by contact with the rear portion of device S, the pin in this position being shown at P'' in FIGURE 2. As the center of gravity of the pin passes inflection point C, its butt end falls on belts 25 as indicated by outline P''' in FIGURE 2. It is at this point that ordinarily misalignment of the pin is most likely to occur due to the sudden flipping up of the head, but with device S this is avoided. As the pin is moved further forward, the forward end 18 of aligning device S falls, maintaining the pressure of its weight on the head of the pin until the pin is clear of point C. Not only does the aligning device thus prevent irregular vertical movement of the head of the pin, but its inverted V-shape, as best seen in FIGURE 3, also prevents irregular lateral movement of the head, thereby insuring its proper aligned movement to its selected point of discharge (not shown).

What is claimed is:

1. A bowling pin handling mechanism for a bowling pin spotting machine comprising a conveyor having a first elongated portion and a second elongated portion connected thereto in angular relationship, pin conveying means for moving articles along said first elongated portion and delivering them onto and along said second elongated portion to a point of discharge therefrom, and pivoted vertically movable means mounted above said first named portion for aligning each pin as it moves along said first portion onto said second portion to prevent upward swinging movement of the head end of each such pin and insure its movement centrally along said second elongated portion to its point of discharge.

2. A bowling pin handling mechanism for a bowling pin spotting machine comprising an elongated distributor having an upwardly inclined portion and a generally horizontal portion connected thereto in an angular relationship, pin conveying means for moving articles along said inclined portion and delivering them onto and along said horizontal portion for movement thereon to a point of discharge therefrom, a device for aligning pins moving from said inclined portion onto said horizontal portion, and means mounting said device for upward movement relative to said upwardly inclined portion in response to a bowling pin moving therebeneath along said inclined portion to prevent upward movement of the head end of a pin and align and center said pin as it moves onto said horizontal portion and thereby insure the movement of said pin centrally along said horizontal portion to its point of discharge.

3. The invention defined in claim 2, wherein said device comprises an elongated inverted, generally V-shaped rigid member, and wherein said means mounting said device include pivotal supports for the rear end of said member supporting the free end thereof for gravity biased movement toward the point of connection of said inclined and horizontal portions of said distributor, whereby said front end of said member moves downwardly in response to the movement of the head end of an aligned and centered pin along said horizontal portion, and stop means limiting the downward movement of said free end of said member.

4. In combination with a conveyor adapted to move elongated articles lengthwise along a path having an upwardly convex point of inflection, a pin restraining and aligning device mounted above said conveyor adjacent said point of inflection, said device comprising an elongated gravity biased body of inverted substantially V-shape, sufficiently broad at its rear end to span the conveyor and tapering to a lesser width at its forward end, said body being pivoted at its rear end on a horizontal axis perpendicular to the travel of the conveyor to permit vertical movement of its forward end, and pivots supporting the device fixedly mounted at such a height above the conveyor as to permit elongated articles carried lengthwise by the conveyor to pass under the body of said device and raise its forward end in passing, the center of gravity of said device being so located that the forward end thereof tends to take a depressed position.

5. A pin setting machine having a distributor boom, the rear portion of which is inclined upwards and the forward portion of which is horizontal whereby the meeting of the two portions comprises an upwardly convex point of inflection, parallel power operated conveyor belts adapted to support a bowling pin and convey it up the inclined portion, past the point of inflection and along the horizontal portion of the distributor boom, and a pin stabilizing and aligning device mounted above the inclined portion of the boom adjacent the point of inflection at a sufficient height above the boom to permit said bowling pin to pass thereunder when conveyed up the inclined portion of the boom, said device comprising an elongated rigid body constituting a trough of inverted V-shape, sufficiently broad at its rear end to span the distributor boom and tapering at its forward end to a width sufficient to accommodate the passage of the head of said pin thereunder but sufficiently narrow to prevent sidewise misalignment of the pin head, said body being pivoted at its rear end on a horizontal axis perpendicular to the travel of the conveyor belts to permit vertical movement of its forward end and having its center of gravity so located that its forward end tends to drop, and pivots supporting the rear end of the body fixedly mounted above the distributor boom.

6. A pinsetting machine as defined in claim 5 in which the rear portions of the body walls of said device are bent vertically downward and provided with pivot holes, a rod positioned above and across the inclined portion of the distributor boom, the ends of said rod passing through said pivot holes and constituting pivots, means to retain the rod ends in said holes, and fixed mounting means for said rod.

References Cited by the Examiner
UNITED STATES PATENTS

| | | | |
|---|---|---|---|
| 2,000,774 | 5/1935 | McKean | 198—73 |
| 2,491,778 | 12/1949 | Smith. | |
| 2,668,056 | 2/1954 | Rundell | 198—20 X |
| 3,071,237 | 1/1963 | Powell | 198—102 X |

EVON C. BLUNK, *Primary Examiner.*

EDWARD A. SROKA, *Examiner.*